United States Patent
Kimmerle

(10) Patent No.: US 11,204,262 B2
(45) Date of Patent: Dec. 21, 2021

(54) SENSOR DEVICE

(71) Applicant: Robert Bosch GmbH, Stuttgart (DE)

(72) Inventor: Mathias Kimmerle, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 16/469,031

(22) PCT Filed: Dec. 28, 2017

(86) PCT No.: PCT/EP2017/084683
§ 371 (c)(1),
(2) Date: Jun. 12, 2019

(87) PCT Pub. No.: WO2018/122284
PCT Pub. Date: Jul. 5, 2018

(65) Prior Publication Data
US 2019/0346285 A1    Nov. 14, 2019

(30) Foreign Application Priority Data

Dec. 29, 2016 (DE) .................. 10 2016 226 301.3
Dec. 13, 2017 (DE) .................. 10 2017 222 677.3

(51) Int. Cl.
*G01D 5/14* (2006.01)
*H02K 15/08* (2006.01)

(52) U.S. Cl.
CPC ............. *G01D 5/145* (2013.01); *H02K 15/08* (2013.01)

(58) Field of Classification Search
CPC ............................ G01D 5/145; H02K 15/08
See application file for complete search history.

(56) References Cited

U.S. PATENT DOCUMENTS 5,289,129 A * 2/1994 Joseph ................. G01R 33/385
324/318
5,351,555 A * 10/1994 Garshelis ................ G01L 3/102
336/30

(Continued)

FOREIGN PATENT DOCUMENTS

DE    1 135 037 B    8/1962
DE    1 483 389 A1   9/1969

(Continued)

OTHER PUBLICATIONS

International Search Report corresponding to PCT Application No. PCT/EP2017/084683, dated Mar. 6, 2018 (German and English language document) (7 pages).

*Primary Examiner* — Dominic E Hawkins
(74) *Attorney, Agent, or Firm* — Maginot, Moore & Beck LLP

(57) ABSTRACT

A method for producing a measurement value transmitter for a sensor device includes providing a magnetic body, providing a coil configured to be supplied with a current, and shaping the coil into a helical winding with an internal diameter that is greater than an outer contour of the magnetic body. The winding is shaped such that the pitch of the winding changes at least in some sections when viewed along the longitudinal extension of the winding. The method further includes arranging the magnetic body within the coil, in particular coaxially to the coil, and supplying the coil with a current so as to magnetize the magnetic body in order to produce the measurement value transmitter.

16 Claims, 1 Drawing Sheet

(56) References Cited

U.S. PATENT DOCUMENTS

| | | | |
|---|---|---|---|
| 6,456,076 B1* | 9/2002 | Joseph | G01R 33/4215 |
| | | | 324/318 |
| 7,117,752 B2* | 10/2006 | May | G01D 5/2046 |
| | | | 73/862.331 |
| 9,482,728 B2* | 11/2016 | Bottomley | G01R 33/421 |
| 2004/0040391 A1 | 3/2004 | May | |
| 2008/0315870 A1* | 12/2008 | May | G01D 5/2046 |
| | | | 324/239 |
| 2009/0102463 A1* | 4/2009 | May | G01D 5/2046 |
| | | | 324/207.16 |
| 2010/0256480 A1 | 10/2010 | Bottomley et al. | |
| 2011/0308330 A1* | 12/2011 | May | G01L 3/104 |
| | | | 73/862.69 |
| 2016/0116554 A1 | 4/2016 | Sakellariou et al. | |
| 2017/0176273 A1* | 6/2017 | Ibl | G01D 5/24423 |

FOREIGN PATENT DOCUMENTS

| | | |
|---|---|---|
| DE | 198 36 599 A1 | 2/2000 |
| DE | 10 2009 022 751 A1 | 12/2010 |
| EP | 0 979 988 A1 | 2/2000 |
| EP | 2 430 418 B1 | 7/2013 |
| JP | S60-125519 A | 7/1985 |
| JP | H11-513797 A | 11/1999 |
| WO | 2007/025720 A1 | 3/2007 |

\* cited by examiner

SENSOR DEVICE

This application is a 35 U.S.C. § 371 National Stage Application of PCT/EP2017/084683, filed on Dec. 28, 2017, which claims the benefit of priority to Serial No. DE 10 2016 226 301.3, filed on Dec. 29, 2016 in Germany, and to Serial No. DE 10 2017 222 677.3, filed on Dec. 13, 2017 in Germany, the disclosures of which are incorporated herein by reference in their entirety.

BACKGROUND

The disclosure relates to a method and a device for producing a measurement transducer for a sensor device, which has a magnetic body as the measurement transducer, the magnetic field orientation of which can be detected by at least one measurement value sensor, so that the current position of the measurement transducer can be deduced depending on the detected magnetic field orientation.

Sensor devices with varying magnetic field are known from the prior art. So, for example the patent specification EP 2 430 418 B1 discloses a sensor device for detecting a torsion angle, a change in length or a magnetic field by means of a sensor body around which a coil is wound. Also, the patent document US 2016/0116554 A already discloses a sensor device with a similar measurement transducer. The measurement transducer is assigned at least one measurement sensor, by means of which the magnetic field of the measurement transducer can be detected. Depending on the measurement field values, a position or change in the position of the measurement transducer can then be detected.

To manufacture such a measurement transducer it is known to design the magnetization in such a way that the resulting magnetic field rotates about an axis which is oriented perpendicular to the direction of motion of the measurement transducer.

Patent specification EP 0 979 988 B1 discloses a further sensor device of the aforementioned type, in which a measurement transducer is helically magnetized by means of a coil winding. Depending on a magnetic field strength and the magnetic field orientation, the sliding position of the measurement transducer is determined. The axis of rotation of the magnetic field in this case is parallel to the direction of motion of the measurement transducer, so that the magnetic field rotates in a plane perpendicular to the direction of motion.

SUMMARY

The method according to the disclosure for producing a measurement transducer is characterized in that a magnetic body is firstly provided, and a coil that can be supplied with current. The coil is formed into a helical or screw-shaped winding, whose inner diameter is greater than the outer contour of the magnetic body, so that the magnetic body can be inserted into the winding along its longitudinal extension, wherein the winding is formed in such a way that—when viewed in the longitudinal extension—its gradient changes, at least in some sections. The magnetic body is introduced into the coil, and the coil is subsequently supplied with current, so that in order to produce the measurement transducer the magnetic body is magnetized according to the path of the helical coil. This provides the advantage that due to the magnetization a rotating magnetic field is generated, which rotates about an axis that extends parallel to the longitudinal extension of the magnetic body and thus in particular along the direction of motion of the magnetic body in the sensor device. This ensures a simple and extremely precise determination of the positions of the measurement transducer in the sensor device. In particular, it is provided that the coil is provided in a fixed position in a device or magnetizing device, into which the magnetic body can be inserted. Alternatively, the coil can be helically wound on the magnetic body, wherein the magnetic body is then withdrawn from the coil after the energizing. Due to the fact that the gradient of the winding varies, at least in some sections, regions of the measurement transducer can be produced which have a different level of measurement sensitivity. As a result, the application possibilities of the measurement transducer thus produced are extended.

In accordance with a preferred extension of the disclosure it is provided that the magnetic body is manufactured from an isotropic magnetic material. Therefore, the magnetic body is magnetizable in any given direction, so that the advantageous path of the magnetic field orientation can be produced permanently and cost-effectively.

Particularly preferably it is provided that the gradient of the winding changes continuously or discontinuously between sections, so that its position can be uniquely identified over the entire length of the magnetic body or the measurement transducer. For example, it is provided that the gradient continuously increases or decreases in a longitudinal direction of the measurement transducer.

In accordance with a preferred extension of the disclosure it is provided that the winding is formed in such a way that at least in some sections—viewed in the longitudinal extension—it has a constant gradient. As a result, sections of the winding and the measurement transducer are obtained which have a constant gradient, wherein because of the advantageous gradient variation, these sections have different gradients. Thus the winding can have, for example, one section with a constant gradient and one section with a continuously changing gradient.

In accordance with a preferred extension of the disclosure it is provided that the winding is formed in such a way that it has at least two sections with different constant gradients. For example, this results in differently sensitive measuring ranges of the measurement transducer.

Due to the advantageous magnetization a simple and reliable determination of the position of the magnetic body is possible and the winding or magnetization can be produced cost-effectively. The winding preferably has two or more such sections with constant gradient.

It is also preferably provided that the winding is formed in such a way that it has at least one clamped section in which its gradient is equal to zero, so that the angle of rotation of the magnetic field of the magnet body in the clamped region generated or magnetized by the clamped section does not change in the displacement direction of the measurement transducer. This creates a longitudinal section of the measurement transducer in which a relevant sensor information is "on/off", and not a specific angle. A gradient equal to zero in this sense is understood to mean a magnetization which extends parallel to the longitudinal extension of the permanent magnet and does not rotate in this clamped region. Therefore the magnetization in this clamped region does not change.

Preferably, the clamped region is formed at an end region of the winding or in a region spaced apart from the end regions of the winding or the magnetic body. The clamped region can thus be assigned to one end of the magnetic body or the winding or, for example, located centrally in the magnetic body or the winding between two sections which have either equal or different gradients. This improves the determination of a measurement position even further and extends the areas of application of the measurement transducer.

In particular, the clamped area is formed between two sections with a predefined gradient of the winding, wherein the gradient in the two sections is equal or different and—as already mentioned above—preferably changes continuously or discontinuously or is constant.

The device according to the disclosure is characterized by a coil that can be supplied with current, which at least in some sections is shaped into a helical winding whose inner diameter is greater than the outer contour of a magnetic body to be magnetized, wherein the winding is formed in such a way that its gradient—viewed in the longitudinal extension of the winding—varies at least in some sections, and by an energy source by means of which the coil can be supplied with current for magnetizing the magnetic body to produce the measurement transducer. This results in the advantages already mentioned.

Further advantages and preferred features result in particular from the previous description as well as from the claims.

It is provided in accordance with a preferred extension of the disclosure that the gradient of the winding on the magnet body is lowest where the highest measurement accuracy is required. As a result, the change of an observed angle of the magnetic field during an axial movement of the measurement transducer relative to the sensors is at its highest at precisely this point, so that here the position of the transducer can be determined particularly accurately.

BRIEF DESCRIPTION OF THE DRAWINGS

In the following the disclosure will be explained in further detail by reference to the drawings. Shown are.

DETAILED DESCRIPTION

Figure 1:
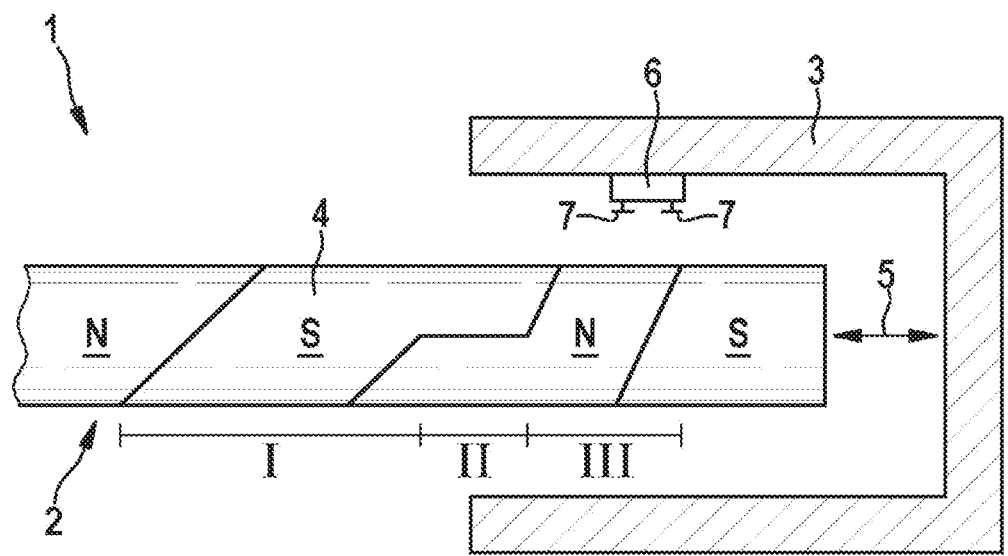
FIG. 1 an advantageous sensor device in a simplified representation.

FIG. 1 shows a simplified sectional view of a sensor device 1, which has a measurement transducer 2 that can be displaced in a housing 3. The measurement transducer 2 has a cylindrical magnetic body 4, which has a circular cross section and, in particular, is produced from an isotropic magnetic material, and is arranged to be displaceable in its longitudinal extension or axially in the housing 3, as shown by a double-headed arrow 5. In addition, a measuring point 6 is provided on the housing 3, by means of which a magnetic field of the measurement transducer 2 can be detected. To this end the measuring point 6 has one or more sensors for detecting magnetic fields. In particular, the sensors are implemented as Hall sensors.

The measurement transducer 2 also has a magnetization 8, which is designed to run in a helical pattern on the magnetic body 4 or extend over the magnet body 4 in the shape of a helix. In this regard, the magnetization 8 has a gradient which extends over at least some sections of the length of the magnetic body 4. The gradient in this case changes continuously or discontinuously, viewed in the longitudinal extension of the magnetic body.

In accordance with the present exemplary embodiment of FIG. 1 it is provided that the magnetization 8 has a plurality of sections I, II and III, in which the magnetization 8 has different gradients. It is envisaged in this case that the gradient in section I is less than the gradient in section III, and that in section II the gradient is equal to zero, so that a so-called clamped range is formed, within which a displacement of the measurement transducer 2 does not lead to any change in the measurement. In each of sections I and III, the gradient is designed to be constant.

With the advantageous sensor device 1, highly accurate measurements can be made, wherein the sensitivity of the sensor device 1 can be adjusted differently over different displacement path sections by means of the respective gradient, and clamped regions (section II) can also be simply produced.

In the following, the production of the magnetic body 4 will be described.

Figure 2:
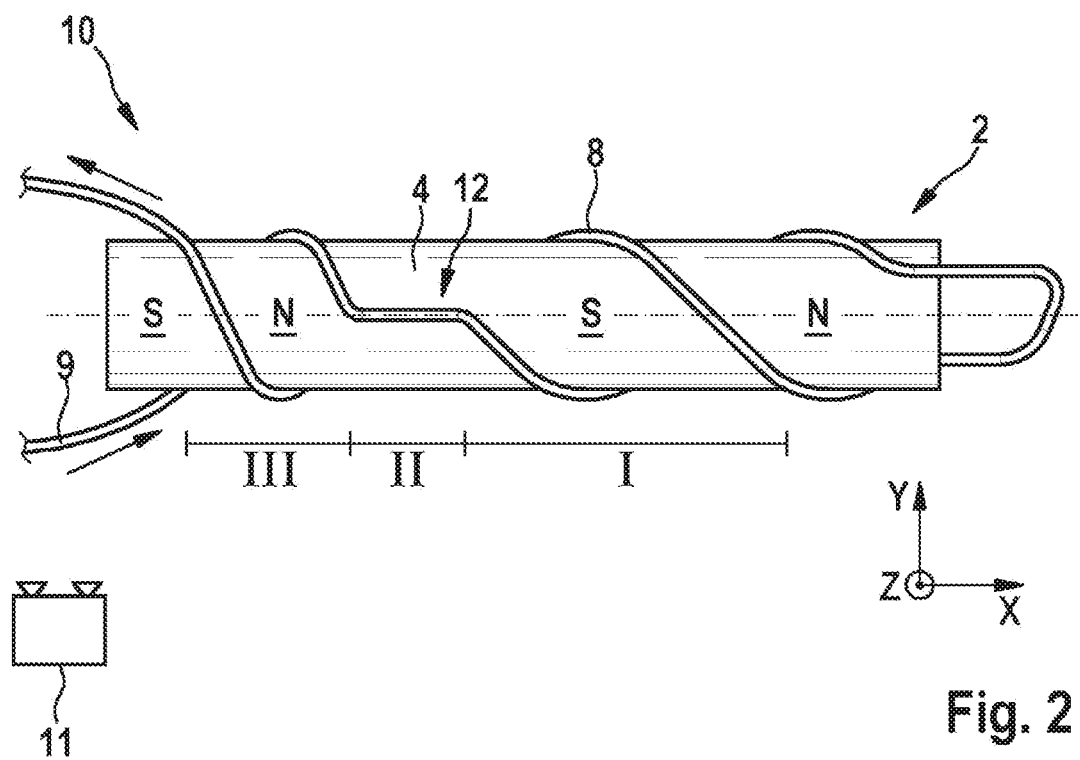
FIG. 2 the production of an advantageous measurement transducer of the sensor device in a simplified representation.

In this connection, FIG. 2 shows an enlarged representation of a device 10 for producing the measurement transducer 2. The measurement transducer 2 and/or the magnetic body 4 is apparent from the figure.

In accordance with the exemplary embodiment shown, the magnetization 8 is produced using a coil 9 of the device 10 formed by a winding wire, which is arranged coaxially to the magnetic body 4 to produce the magnetization of the magnetic body 4.

The device 10 also preferably has a mounting device (not shown here), which is designed for the mounting and alignment of the magnetic body 4 within the winding, so that, for example, a physical contact between the winding and the magnetic body 4, or a central arrangement and orientation of the magnetic body 4 relative to the coil 9 is ensured. In particular, the mounting device is designed to move the magnetic body 4 into and out of the coil 9 in the direction of its longitudinal extension.

The device 10 also has an energy source 11 which can be connected to the coil 9, in order to supply this with current for producing the measurement transducer 2. If the coil 9 is supplied with current, then across the winding wire into which the current is injected a north pole N is produced, and below it a south pole S. Due to physical principles, each pole N, S has a full-valued antipole on the reverse outer surface of the magnetic body 4.

In order to obtain the previously described course of the helical magnetization of the magnetic body 4, the coil is shaped to form a helix-shaped winding, which has a plurality of sections I, II and III in which different gradients are formed, corresponding to the gradients of the magnetic body 4 described in relation to FIG. 1, as shown in FIG. 2.

Once the magnetization 8 has been produced, its pattern corresponds to the helical pattern of the coil 9, so that the magnetization 8 or its magnetic field orientation also extends in a helical or screw-shaped pattern along the magnetic body 4. The coil 9 is then removed and the magnetic body 4 is installed in the housing 3.

If this measurement transducer 2 is now moved in a linear manner, in accordance with arrow 5, and at the measurement point 6 which is stationary with respect to it, the resulting angles and/or individual components of the magnetic flux density or magnetic field of the measurement transducer 2 are measured by means of the sensor 7, it is possible, in all three spatial directions in accordance with the coordinate system shown in FIG. 2, to detect a more or less sinusoidal change in all three flux density components.

The combination of any two of the three measured flux density components leads in most cases to at least two continuous arctangent information values. There are two continuous output signals produced, which in combination may increase the accuracy and robustness of the measurement signal.

Due to the advantageous gradient of the helical or screw-shaped magnetization 8, which optionally changes along the magnetic body 4, unique information or a unique spatial angle can be detected, even beyond a magnetic angle of 360°, by means of which the displacement position of the magnetic body 4 or of the measurement transducer 2 is unambiguously identifiable.

The gradient of the magnetization 8 is preferably chosen in such a way that it is at its lowest at the point where the highest measurement accuracy is required, so that at this point a displacement of the transducer 2 relative to the measuring point 6 has the highest resolution accuracy with respect to the measurement signal, and therefore the highest measurement sensitivity. This is recommended for sensor applications in which one measurement range must be more accurate than other ranges.

In this case it is also imaginable to design a differential measurement principle with two measuring points 6, because then the difference signal is largest where the gradient of the magnetization 8 is ideally of similar size to the distance between the two measuring points 6.

Conveniently, the sensor device 1 has a control unit, not shown here, or at least a microcontroller, which monitors the output signals of the sensors 7 to determine the position of the measurement transducer 2 with respect to the stationary or housing-fixed measurement point 6.

Advantageously, the constant or changing gradient extends within a limited section viewed in the longitudinal direction of the magnetic body or the coil 9. As shown in FIG. 2, sections of the coil 9 can also extend with a gradient equal to zero, so that the angle of rotation of the magnetic field of the magnetic body 4 in this so-called clamped region 12 does not change. The clamped region 12 can be arranged between two coil sections with a predetermined constant or varying gradient, as shown in the present exemplary embodiment, or else in one or both of the end regions of the magnetic body 4.

The invention claimed is:

1. A method for producing a measurement transducer for a sensor device with a magnetic body and a coil configured to be supplied with current, the method comprising:
   forming the coil into a helical winding with an inner diameter that is greater than an outer contour of the magnetic body, the winding formed to have a gradient that changes at least in some sections when viewed in the longitudinal extension of the winding;
   arranging the magnetic body within the coil;
   supplying current to the coil to permanently magnetize the magnetic body as the measurement transducer; and
   removing the permanently magnetized measurement transducer from the winding.

2. The method as claimed in claim 1, wherein the winding is formed such that the gradient changes continuously within at least one section.

3. The method as claimed in claim 1, wherein the winding is formed to have a constant gradient at least in some sections.

4. The method as claimed in claim 1, wherein the winding is formed to have at least two sections with different constant gradients.

5. The method as claimed in claim 1, wherein the winding is formed to have at least one clamped section within which the gradient of the coil is equal to zero.

6. The method as claimed in claim 5, wherein the clamped section is formed at an end region of the winding or the magnetic body, or in a region spaced apart from the end region.

7. The method as claimed in claim 5, wherein the clamped section is formed between two sections of the winding with a predefined gradient.

8. The method as claimed in claim 1, wherein the arranging of the magnetic body within the coil includes arranging the magnetic body coaxially within the coil.

9. The method as claimed in claim 1, wherein the forming of the coil into the helical winding includes forming a first winding section having a first gradient, a second winding section having zero gradient, and a third winding section having a second gradient that is different from the first gradient.

10. The method as claimed in claim 9, wherein the first gradient and the second gradient are both constant.

11. The method as claimed in claim 10, wherein the first gradient and the second gradient run in the same direction.

12. The method as claimed in claim 1, wherein the supplying of the current to the magnetic body includes energizing the winding such that the magnetization or magnetic field alignment of the magnet body extends in a helical or screw shaped pattern along the magnetic body.

13. A device for producing a measurement transducer for a sensor device, comprising:
   a magnetic body configured to be permanently magnetized as the measurement transducer;
   a coil formed into a helical winding with an inner diameter that is greater than an outer contour of the magnetic body; and
   an energy source configured to supply current to the coil so as to permanently magnetize the magnetic body such that the magnetic body becomes the measurement transducer,
   wherein the winding is formed to have a gradient that varies at least in some sections when viewed in a longitudinal extension of the winding.

14. The device as claimed in claim 13, wherein the helical winding includes a first winding section having a first gradient, a second winding section having zero gradient, and a third winding section having a second gradient that is different from the first gradient.

15. The device as claimed in claim 14, wherein the first gradient and the second gradient are both constant.

16. The device as claimed in claim 15, wherein the first gradient and the second gradient run in the same direction.

* * * * *